(12) United States Patent
Hwang et al.

(10) Patent No.: US 9,477,105 B2
(45) Date of Patent: Oct. 25, 2016

(54) DISPLAY DEVICE

(71) Applicant: Samsung Display Co., Ltd., Yongin, Gyeonggi-Do (KR)

(72) Inventors: Tae Hyung Hwang, Seoul (KR); Won Ho Kim, Seongnam-si (KR); Young Jin Park, Suwon-si (KR); Seong Su Lim, Seoul (KR)

(73) Assignee: Samsung Display Co., Ltd. (KR)

( * ) Notice: Subject to any disclaimer, the term of this patent is extended or adjusted under 35 U.S.C. 154(b) by 156 days.

(21) Appl. No.: 14/453,472

(22) Filed: Aug. 6, 2014

(65) Prior Publication Data
US 2015/0277171 A1   Oct. 1, 2015

(30) Foreign Application Priority Data
Apr. 1, 2014   (KR) .................. 10-2014-0038838

(51) Int. Cl.
*G02F 1/133*   (2006.01)
*G02F 1/1368*   (2006.01)

(52) U.S. Cl.
CPC ....... *G02F 1/13306* (2013.01); *G02F 1/13318* (2013.01); *G02F 1/1368* (2013.01)

(58) Field of Classification Search
CPC .............. H01L 33/62; H01L 51/5056; H01L 51/5088; H01L 51/5072; H01L 51/5092; H01L 51/5206; H01L 51/5221; H01L 51/0023; H01L 51/5203; H01L 51/5284; H01L 27/3211; H01L 27/3244; H01L 27/3262; H01L 27/124; H01L 27/156; H01L 27/3218; H01L 27/3272; H01L 2224/73265; H01L 29/45; H01L 2924/12041; H01L 2924/12044; H01L 31/02164; H01L 33/06; H01L 33/08; H01L 45/1253; G02F 1/1368; G02F 1/13306; G02F 1/133345; G02F 1/1362; G02F 1/136277; G02F 1/136286; G02F 1/1354; G02F 1/136209; G02F 1/1365; G02F 1/1366; G02F 1/135; G02F 1/136; G02F 1/1335; G02F 1/1333; G02F 1/1343; G02F 2201/58; G09G 3/3233; G09G 3/3648; G09G 2300/0426; G09G 2300/046
USPC ............. 257/292, 4, 432, 440, 443, 448, 72; 250/208.1, 206.1, 208.2, 214 AL; 345/88, 175, 173, 207, 690; 349/43, 349/138, 139, 62, 49, 50, 65, 61, 110, 106; 362/97.1
See application file for complete search history.

(56) References Cited

U.S. PATENT DOCUMENTS 7,852,440 B2   12/2010   Kunimori et al.
8,253,896 B2   8/2012   Yoon et al.
(Continued)

FOREIGN PATENT DOCUMENTS

JP   2005-070132   3/2005
JP   2007-304520   11/2007
(Continued)

OTHER PUBLICATIONS

Sanjoh et al., "Off current characteristics of amorphous silicon thin film transistors under gate-side illumination", Thin Solid Films, 1992, pp. 125-131, v. 208.

*Primary Examiner* — Thoi Duong
(74) *Attorney, Agent, or Firm* — Innovation Counsel LLP

(57) ABSTRACT

The inventive concept relates to a display device in which luminance of a light source is corrected, and the display device according to an exemplary embodiment of the inventive concept includes: a display panel displaying an image; a light source unit supplying light to the display panel; a light sensing unit embeded in the display panel and sensing a light intensity from the light source unit; and a light source controller receiving information regarding the light intensity from the light sensing unit to control a light intensity from the light source unit, wherein the light sensing unit includes a light sensing layer, and a first electrode and a second electrode formed on either side of the light sensing layer in a plan view.

11 Claims, 7 Drawing Sheets

(56) References Cited

U.S. PATENT DOCUMENTS

| | | | |
|---|---|---|---|
| 2005/0082968 A1* | 4/2005 | Choi | G09G 3/3225 313/506 |
| 2006/0118697 A1* | 6/2006 | Lee | G01J 1/32 250/205 |
| 2007/0268241 A1 | 11/2007 | Nitta et al. | |
| 2009/0085859 A1 | 4/2009 | Song | |
| 2010/0065851 A1 | 3/2010 | Makita | |
| 2012/0268356 A1* | 10/2012 | Kim | G02F 1/13338 345/84 |

FOREIGN PATENT DOCUMENTS

| | | |
|---|---|---|
| JP | 4048627 | 12/2007 |
| JP | 2011-028058 | 2/2011 |
| JP | 5207824 | 3/2013 |
| KR | 10-2008-0073951 | 8/2008 |
| KR | 10-2008-0112847 | 12/2008 |

* cited by examiner

DISPLAY DEVICE

CROSS-REFERENCE TO RELATED APPLICATION

This application claims priority to and the benefit of Korean Patent Application No. 10-2014-0038838 filed in the Korean Intellectual Property Office on Apr. 1, 2014, the entire contents of which are incorporated herein by reference.

BACKGROUND (a) Technical Field

The inventive concept relates to a display device. More particularly, the inventive concept relates to a display device in which luminance of a light source is compensated according to lapse of time using the display device.

(b) Description of the Related Art

A computer monitor, a television, a mobile phone, and the like that are widely used need a display device. Examples of the display device are a cathode ray tube display device, a liquid crystal display, and a plasma display device.

The liquid crystal display (LCD) is one of the most widely used flat panel displays (FPD), and it is composed of two display panels on which field generating electrodes are formed, and a liquid crystal layer interposed between the two display panels. A voltage is applied to the field generating electrodes to generate an electric field on the liquid crystal layer, and the orientation of liquid crystal molecules of the liquid crystal layer is determined and the polarization of incident light is controlled through the generated electric field to display an image.

Since such a liquid crystal display is not self-emissive, a light source is required. In this case, the light source may be a separately provided artificial light source or a natural light source. The artificial light source used in the liquid crystal display includes a light emitting diode (LED), a cold cathode fluorescent lamp (CCFL), and an external electrode fluorescent lamp (EEFL).

Recently, a light emitting diode (LED) has been used as the light source of the liquid crystal display, however the light emitting diode (LED) has a drawback that the luminance is gradually decreased according to lapse of time using the display device. For example, the luminance is decreased to about 50% of initial luminance after one year of use according to a frequency used in a case of a general monitor.

The above information disclosed in this Background section is only for enhancement of understanding of the background of the invention and therefore it may contain information that does not form the prior art.

SUMMARY

The inventive concept provides a display device in which luminance of a light source is corrected.

A display device according to an exemplary embodiment of the inventive concept includes a display panel displaying an image, a light source unit supplying light to the display panel, a light sensing unit embedded in the display panel and sensing a light intensity from the light source unit, and a light source controller receiving information regarding the light intensity from the light sensing unit to control a light intensity from the light source unit. The light sensing unit includes a light sensing layer, and a first electrode and a second electrode formed on either side of the light sensing layer in a plan view.

The light sensing unit may further include an insulating layer formed under the light sensing layer, and an ohmic contact layer formed between the light sensing layer and the first electrode and between the light sensing layer and the second electrode.

The light source controller increases the light intensity from the light source unit when the light intensity received from the light sensing unit is smaller than a reference value.

The display panel may include a display area and a peripheral area surrounding the display area, and the light sensing unit is formed in the peripheral area.

The display panel may include a first substrate and a second substrate facing each other, a thin film transistor formed on the first substrate, a pixel electrode connected to the thin film transistor, and a common electrode formed on the second substrate.

The light sensing unit may be formed on the second substrate.

The display panel may further include a light blocking member formed in the peripheral area on the second substrate.

The display device according to an exemplary embodiment of the inventive concept may further include a dummy thin film transistor formed on the first substrate, and a dummy pixel electrode connected to the dummy thin film transistor.

The thin film transistor and the pixel electrode may be formed in the display area, and the dummy thin film transistor and the dummy pixel electrode may be formed in the peripheral area.

The first electrode and the second electrode may be formed with the same material and at the same layer as the common electrode.

The light sensing unit may further include a gate electrode formed under the insulating layer.

The display panel may further include a light blocking member formed in the peripheral area on the second substrate.

The display device according to an exemplary embodiment of the inventive concept may further include a dummy thin film transistor formed on the peripheral area on the first substrate, and a dummy pixel electrode connected to the dummy thin film transistor, the dummy pixel electrode overlapping the light sensing unit.

The thin film transistor and the pixel electrode may be formed in the display area, and the dummy thin film transistor and the dummy pixel electrode may be formed in the peripheral area.

The first electrode and the second electrode may be formed with the same material and at the same layer as the common electrode.

The light sensing unit may further include a gate electrode formed under the insulating layer.

The display panel may further include a light blocking member formed in the peripheral area on the second substrate.

The display device may further include a dummy thin film transistor formed on the first substrate, and a dummy pixel electrode connected to the dummy thin film transistor. The thin film transistor and the pixel electrode are formed in the display area, and the dummy thin film transistor and the dummy pixel electrode are formed in the peripheral area.

The light sensing unit may be formed on the first substrate.

The display panel may further include a light blocking member formed in the peripheral area on the second substrate.

The thin film transistor may include a gate electrode, a semiconductor formed on the gate electrode, and a source electrode and a drain electrode formed on the semiconductor and separated from each other.

The light sensing layer of the light sensing unit may be formed with the same material and the same layer as the semiconductor of the thin film transistor, and the first electrode and the second electrode of the light sensing unit may be formed with the same material and the same layer as the source electrode and the drain electrode of the thin film transistor.

The light sensing unit may further include a gate electrode formed under the insulating layer.

The gate electrode of the light sensing unit may be formed with the same material and at the same layer as the gate electrode of the thin film transistor.

The light sensing layer may be made of amorphous silicon.

According to the exemplary embodiments of the inventive concept, the display device has the following effects.

The display device according to an exemplary embodiment of the inventive concept senses the light intensity supplied from the light source unit to control the light intensity of the light source unit, thereby uniformly maintaining the luminance of the display device.

DETAILED DESCRIPTION OF THE EMBODIMENTS

Figure 1:
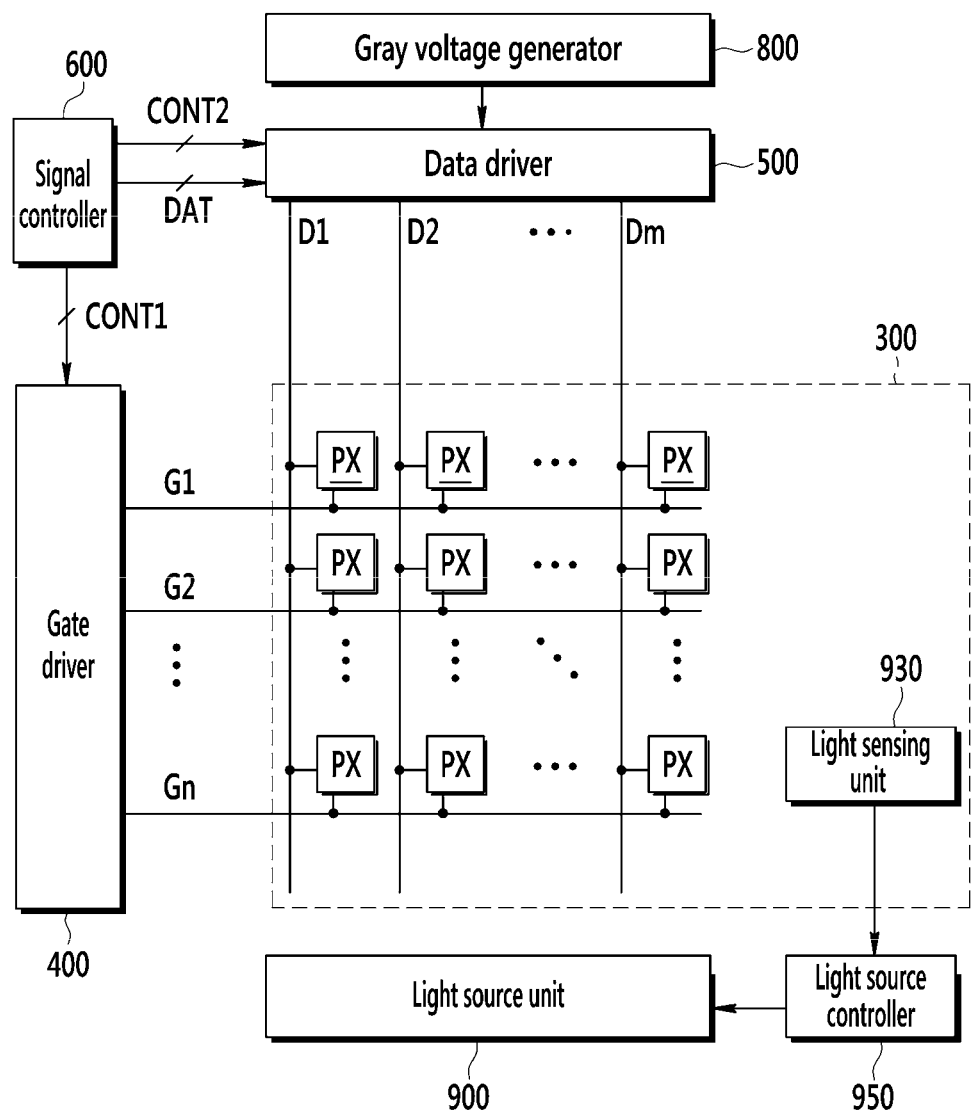
FIG. 1 is a block diagram of a display device according to an exemplary embodiment of the present invention.

The inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be formed directly on the other element or formed with intervening elements. In contrast, when an element is referred to as being "directly on" another element, there are no intervening elements present.

First, a display device according to an exemplary embodiment of the inventive concept will be described with reference to FIG. 1.

FIG. 1 is a block diagram of a display device according to an exemplary embodiment of the inventive concept.

As shown in FIG. 1, a display device according to an exemplary embodiment of the inventive concept includes a display panel 300 displaying an image, a signal controller 600 controlling signals to drive the display panel 300, a light source unit 900 supplying light to the display panel 300, a light sensing unit 930 sensing a light amount supplied from the light source unit 900, and a light source controller 950 controlling light intensity supplied from the light source unit 900.

The display panel 300 includes a plurality of gate lines G1-Gn and a plurality of data lines D1-Dm, the plurality of gate lines G1-Gn may extend in a horizontal direction, and the plurality of data lines D1-Dm may extend in a vertical direction while crossing the plurality of gate lines G1-Gn.

One of the gate lines G1 to Gn and one of the data lines D1 to Dm are connected with one pixel, and a switching element (not shown) connected with the gate lines G1 to Gn and the data lines D1 to Dm is included in the one pixel. The switching element may be made of a three terminal element such as a thin film transistor (TFT). The switching element includes a control terminal connected to the gate lines G1-Gn, an input terminal connected to the data lines D1-Dm, and an output terminal connected to the liquid crystal capacitor Clc and the storage capacitor Cst.

The display panel 300 of FIG. 1 is shown as a liquid crystal panel, however the display panel 300 according to the inventive concept may be various display panels such as an organic light emitting panel, an electrophoretic display panel, and a plasma display panel, as well as the liquid crystal panel.

The signal controller 600 processes image data DAT and a control signal thereof so as to be suitable for an operation condition of the liquid crystal panel 300 in response to the image data DAT and the control signal thereof, for example, a vertical synchronization signal Vsync, a horizontal synchronizing signal Hsync, a main clock signal MCLK, a data enable signal DE, and the like, and then generates and outputs a gate control signal CONT1 and a data control signal CONT2.

The gate control signal CONT1 includes a vertical synchronization start signal STV instructing a start of an output of a gate-on pulse (a high section of the gate signal GS), a gate clock signal CPV controlling an output time of the gate-on pulse, and the like.

The data control signal CONT2 includes a horizontal synchronization start signal STH instructing a start of an input of the image data DAT, a load signal TP for applying the corresponding data voltage to the data line D1-Dm, and the like.

The backlight unit 900 supplies the light to the display panel 300, and the supplied light displays an image while passing through the display panel 300. The light source unit 900 may include at least one light emitting member. The light emitting member may be made of a light emitting diode (LED). The light emitting member is not limited to the light emitting diode (LED), and may be made of a cold cathode fluorescent lamp (CCFL) or an external electrode fluorescent lamp (EEFL).

Further, the light source unit 900 is classified into a side light type and a direct light type according to locations of the light source 900. In a case of the side light type, the light source unit 900 is disposed at one edge of a light guide plate so as to uniformly transmit the light to the light emitting surface of the light guide plate. In a case of the direct light type, the light source unit 900 is uniformly disposed at the entire lower side of the display panel 300 to supply the light to the display panel 300.

The light sensing unit 930 is embeded in the display panel 300. The light source unit 900 supplies the light to the display panel 300, and since the light sensing unit 930 is embeded in the display panel 300, it is also supplied with the light. The light sensing unit 930 senses the light intensity supplied from the light source unit 900 and transmits information regarding the light intensity supplied from the light source 900 to the light source controller 950.

The light source controller 950 controls the light supply amount of the light source unit 900 based on the information regarding the light intensity received from the light sensing unit 930. When a value of the light amount received from the light sensing unit 930 is smaller than a reference value, the light source controller 950 increases the intensity of the light supplied from the light source unit 900.

Although the light source unit 900 maintains the constant output current, the intensity of the light supplied from the light source 900 may be decreased according to lapse of time using the display device. Accordingly, the output current may be increased to constantly maintain the intensity of the light supplied from the light source unit 900. That is, in the present exemplary embodiment, the light source controller 950 sets a reference value according to a desired luminance and senses the intensity of the light supplied from the light source unit 900 to compare it with the reference value and to increase the output current of the light source unit 900 to increase the intensity of the light supplied from the light source 900 when the intensity of the light supplied from the light source unit 900 is lower than the reference value, thereby maintaining the constant light intensity.

The display device according to an exemplary embodiment of the inventive concept may further include a gate driver 400 driving the gate lines G1-Gn and a data driver 500 driving the data lines D1-Dm.

A plurality of gate lines G1-Gn of the display panel 300 are connected to the gate driver 400, and the gate driver 400 alternately applies the gate-on voltage Von and the gate-off voltage Voff to the gate lines G1-Gn according to the gate control signal CONT1 applied to the signal controller 600.

The display panel 300 may be formed of two substrates which are bonded to each other while facing each other, and the gate driver 400 may be attached to one edge of the display panel 300. Further, the gate driver 400 may be integrated in the display panel 300 together with the gate lines G1 to Gn, the data lines D1 to Dm, and the switching element Q. That is, the gate driver 400 may be simultaneously formed in a process of forming the gate lines G1 to Gn, the data lines D1 to Dm, and the switching element Q.

The plurality of data lines D1 to Dm of the display panel 300 are connected with the data driver 500, and the data driver 500 receives the data control signal CONT2 and the image data DAT from the signal controller 600. The data driver 500 converts the image data DAT to a data voltage by using a gray voltage generator 800, and transfers the converted data voltage to the data lines D1 to Dm.

Next, a display device according to an exemplary embodiment of the inventive concept will be described with reference to FIG. 2 and FIG. 3.

Figure 2:
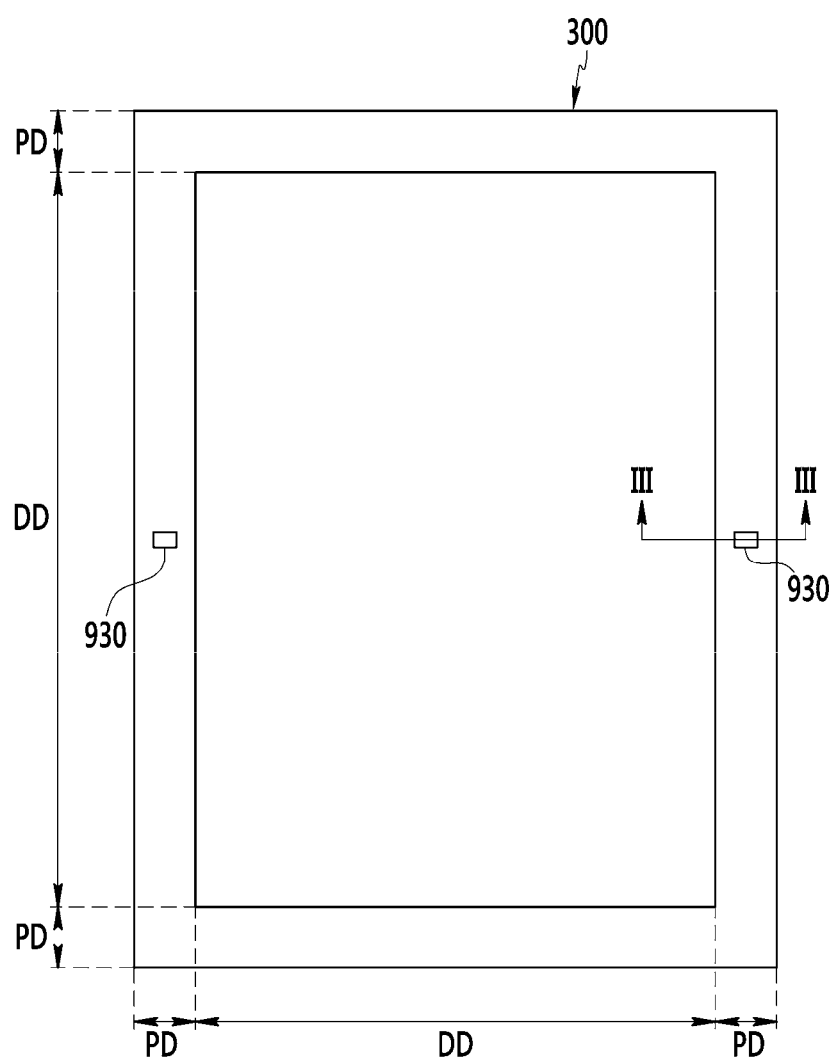
FIG. 2 is a top plan view of a display panel for a display device according to an exemplary embodiment of the present invention.
Figure 3:
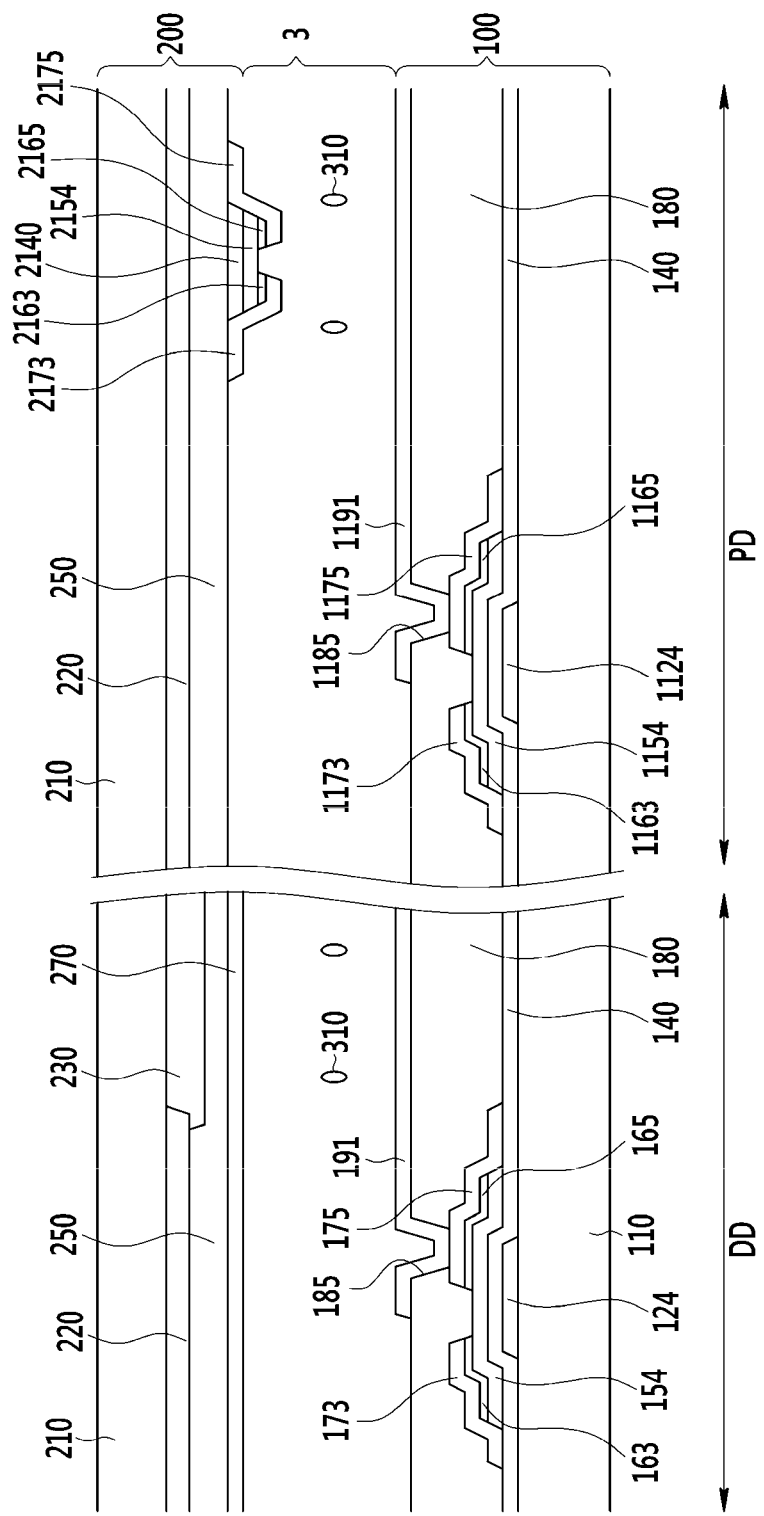
FIG. 3 is a cross-sectional view of the display panel for a display device according to an exemplary embodiment of the inventive concept taken along a line III-III of FIG. 2.

FIG. 2 is a top plan view of a display panel for a display device according to an exemplary embodiment of the inventive concept, and FIG. 3 is a cross-sectional view of the display panel for a display device according to an exemplary embodiment of the inventive concept taken along a line III-III of FIG. 2.

A display panel of the display device according to an exemplary embodiment of the inventive concept, as shown in FIG. 2, includes a display area DD positioned at a center and a peripheral area PD enclosing the display area DD.

The display area DD which display the image includes a plurality of pixels PX. The pixel PX includes a thin film transistors connected to the gate lines G1-Gn and the data lines D1-Dm, and a pixel electrode 191 connected to each of the thin film transistor.

The peripheral area PD does not display the image and surrounds the display area DD. To prevent light leakage through the peripheral area PD, a light blocking member 220 is formed in the peripheral area PD. The light blocking member 220 is formed of a light blocking material such that the light provided from the light source unit 900 may not pass through the light blocking member 220 in the display panel 300. The light sensing unit 930 is formed in the peripheral area PD. The light supplied from the light source unit 900 reaches the light sensing unit 930 such that the light sensing unit 930 may measure the intensity of the light supplied from the light source unit 900.

The display panel 300 includes a lower panel 100 and an upper panel 200 facing to each other, and a liquid crystal layer 3 interposed therebetween.

First, the lower panel 100 will be described.

A gate electrode 124 is formed on a first substrate 110 made of transparent glass or plastic. The gate electrode 124 is connected to the gate lines G1-Gn and may be formed with the same layer as the gate lines G1-Gn.

The gate electrode 124 may be made of a low resistivity metal material. The gate electrode 124 may be formed of a single layer or a multilayer including at least two conductive layers having different physical properties.

A gate insulating layer 140 made of a silicon nitride (SiNx) or a silicon oxide (SiOx) is formed on the gate electrode 124. The gate insulating layer 140 may have a multilayer structure including at least two insulating layers having different physical properties.

A semiconductor 154 made of amorphous silicon or polysilicon is formed on the gate insulating layer 140.

Ohmic contact layers 163 and 165 are formed on the semiconductor 154. The ohmic contact layers 163 and 165 may be made of a material such as n+ hydrogenated amorphous silicon in which an n-type impurity such as phosphorus is doped with a high concentration, or of a silicide. The ohmic contact layers 163 and 165 may be disposed on either side of the semiconductor 154 and be separated from each other by a channel region.

A source electrode 173 and a drain electrode 175 are formed on the ohmic contact layers 163 and 165 and the gate insulating layer 140. The source electrode 173 and the drain electrode 175 are separated by a channel region which overlaps the gate electrode 124. The source electrode 173 is connected to the data lines D1-Dm and may be formed with the same layer as the data lines D1-Dm.

The source electrode 173 and the drain electrode 175 may be made of the low resistivity metal material The source electrode 173 and the drain electrode 175 may be formed of a single layer or a multilayer including at least two conductive layers having different physical properties.

One gate electrode 124, one source electrode 173, and one drain electrode 175 along with the semiconductor 154 constitute one thin film transistor (TFT), and a channel of the TFT is formed in the semiconductor 154 between the source electrode 173 and the drain electrode 175. The thin film transistor is formed in the display area DD.

A passivation layer 180 is formed on the source electrode 173, the drain electrode 175, the gate insulating layer 140, and exposed portions of the semiconductor 154. The passivation layer 180 may be made of an organic insulating material or an inorganic insulating material. The passivation layer 180 may be made of the single layer or the multilayer.

The passivation layer 180 has a contact hole 185 to expose at least a portion of the drain electrode 175.

The pixel electrode 191 is formed on the passivation layer 180. The pixel electrode 191 is formed in the display area DD. The pixel electrode 191 is connected to the drain electrode 175 through the contact hole 185. The pixel electrode 191 may be made of a transparent metal material such as indium-tin oxide (ITO) and indium-zinc oxide (IZO).

Although not shown, a first alignment layer is formed on the pixel electrode 191 and the passivation layer 180.

Next, the upper panel 200 will be described.

The light blocking member 220 is formed on a second substrate 210. The light blocking member 220 may be formed of a black matrix and prevents light leakage. The light blocking member 220 may be formed in a boundary between the pixels PX in the display area DD. Also, the light blocking member 220 may be formed in the peripheral area PD, as described above. In this case, the light blocking member 220 may be formed in the entire peripheral area PD.

A plurality of color filters 230 are formed on the second substrate 210. A color filter 230 is formed in each pixel PX. The color filter 230 is surrounded by the light blocking member 220 in the display area DD, and may extend along a column of the pixel electrode 191. An edge of the color filter 230 may partially overlap the light blocking member 220. Each color filter may express one of the primary colors such as three primary colors including red, green, and blue. However, the colors displayed by the color filter 230 are not limited to the three primary colors such as red, green, and blue, and the color filter 230 may express one of cyan, magenta, yellow, and white-based colors. The color filter 230 may be formed on the first substrate 110.

An overcoat 250 is formed on the light blocking member 220 and the color filter 230. The overcoat 250 is made of an organic material thereby flattening the upper surface of the light blocking member 220 and the color filter 230.

A common electrode 270 is formed on the overcoat 250. The common electrode 270 may be made of the transparent metal material such as indium-tin oxide (ITO) and indium-zinc oxide (IZO).

Also, an insulating layer 2140 is formed on the overcoat 250. The insulating layer 2140 may be omitted if necessary.

A light sensing layer 2154 is formed on the insulating layer 2140. The light sensing layer 2154 may be made of amorphous silicon.

Ohmic contact layers 2163 and 2165 are formed on the light sensing layer 2154. The ohmic contact layers 2163 and 2165 may be made of a material such as n+ hydrogenated amorphous silicon in which an n-type impurity such as phosphorus is doped at a high concentration, or of a silicide. The ohmic contact layers 2163 and 2165 may be disposed on either sides of the light sensing layer 2154 to be separated from each other.

A first electrode 2173 and a second electrode 2175 are formed on the ohmic contact layers 2163 and 2165 and the overcoat 250. The first electrode 2173 and the second electrode 2175 are separated from each other and partially overlap the light sensing layer 2154. The first electrode 2173 and the second electrode 2175 may be formed with the same layer and the same material as the common electrode 270.

The first electrode 2173 and the second electrode 2175 form one light sensing unit 930 along with the light sensing layer 2154. That is, in the present exemplary embodiment, the light sensing unit 930 is formed of a photodiode. The light sensing unit 930 is formed on the upper panel 200 in the peripheral area PD.

Although not shown, a second alignment layer may be further formed on the common electrode 270.

Polarizers (not illustrated) may be located at outer surfaces of the lower panel 100 and the upper panel 200. Polarization axes of the two polarizers may be orthogonal.

The liquid crystal layer 3 positioned between the lower panel 100 and the upper panel 200 functions as a dielectric material of the liquid crystal capacitor Clc. The liquid crystal layer 3 includes a plurality of liquid crystal molecules 310. The pixel electrode 191 is applied with the data voltage through the thin film transistor, and the common electrode 270 is applied with a predetermined common voltage. Accordingly, an electric field is formed between the pixel electrode 191 and the common electrode 270, thereby determining a direction of the liquid crystal molecules 310. The light amount passing through the liquid crystal layer 3 is changed according to the direction of the liquid crystal molecule 310.

The display device according to an exemplary embodiment of the inventive concept may be a normally white mode or normally black mode device. The normally white mode is a mode in which all light supplied from the light source unit 900 passes through the liquid crystal layer 3 in an initial state in which the electric field is not formed between the pixel electrode 191 and the common electrode 270 such that a white screen appears. The normally black mode is a mode in which no light supplied from the light source unit 900 passes through the liquid crystal layer 3 when the electric field is not formed such that a black screen appears.

In the case of the normally white mode, although the electric field is not formed to the liquid crystal molecules 310, all light supplied from the light source unit 900 passes through the liquid crystal layer 3 and is transmitted to the light sensing unit 930. In contrast, in the case of the normally black mode, when the electric field is not formed to the liquid crystal molecules 310, no light supplied from the light source unit 900 passes through the liquid crystal layer 3, so light is not transmitted to the light sensing unit 930. Accordingly, in the case of the liquid crystal display of the normally black mode, a dummy pixel electrode is formed in the peripheral area PD to form the electric field to the liquid crystal layer 3.

The dummy pixel is formed in the peripheral area PD and may have substantially the same structure as the pixel formed in the display area DD. In the dummy pixel, a dummy thin film transistor and a dummy pixel electrode 1191 connected to the dummy thin film transistor are formed, and this will be further described.

A dummy gate electrode 1124 is formed on the first substrate 110. The dummy gate electrode 1124 may be formed with the same material and the same layer as the gate electrode 124. The gate insulating layer 140 is formed on the dummy gate electrode 1124.

A dummy semiconductor 1154 is formed on the gate insulating layer 140. The dummy semiconductor 1154 may be formed with the same material and the same layer as the semiconductor 154. Dummy ohmic contact layers 1163 and 1165 are formed on the dummy semiconductor 1154. The dummy ohmic contact layers 1163 and 1165 may be formed with the same material and the same layer as the ohmic contact layers 163 and 165.

A dummy source electrode 1173 and a dummy drain electrode 1175 are formed on the dummy ohmic contact layers 1163 and 1165 and the gate insulating layer 140. The dummy source electrode 1173 and the dummy drain electrode 1175 are separated from each other and partially overlap the dummy semiconductor 1154 on the dummy gate electrode 1124. The dummy source electrode 1173 and the dummy drain electrode 1175 may be formed with the same material and the same layer as the source electrode 173 and the drain electrode 175.

The dummy gate electrode 1124, the dummy source electrode 1173, and the dummy drain electrode 1175 form one dummy thin film transistor along with the dummy semiconductor 1154, and the channel of the dummy thin film transistor is formed in the dummy semiconductor 1154 between the dummy source electrode 1173 and the dummy drain electrode 1175. The dummy thin film transistor is formed in the peripheral area PD.

The passivation layer 180 is formed on the dummy source electrode 1173, the dummy drain electrode 1175, and the exposed portion of the dummy semiconductor 1154. The passivation layer 180 has a contact hole 1185 to expose at least a portion of the dummy drain electrode 1175.

A dummy pixel electrode 1191 is formed on the passivation layer 180. The dummy pixel electrode 1191 is formed in the peripheral area PD. The dummy pixel electrode 1191 is connected to the dummy drain electrode 175 through the contact hole 1185. The dummy pixel electrode 1191 may be formed with the same material and the same layer as the pixel electrode 191.

Next, a principle for sensing the light amount by the light sensing unit 930 in the display device according to an exemplary embodiment of the inventive concept will be described with reference to FIG. 4.

Figure 4:
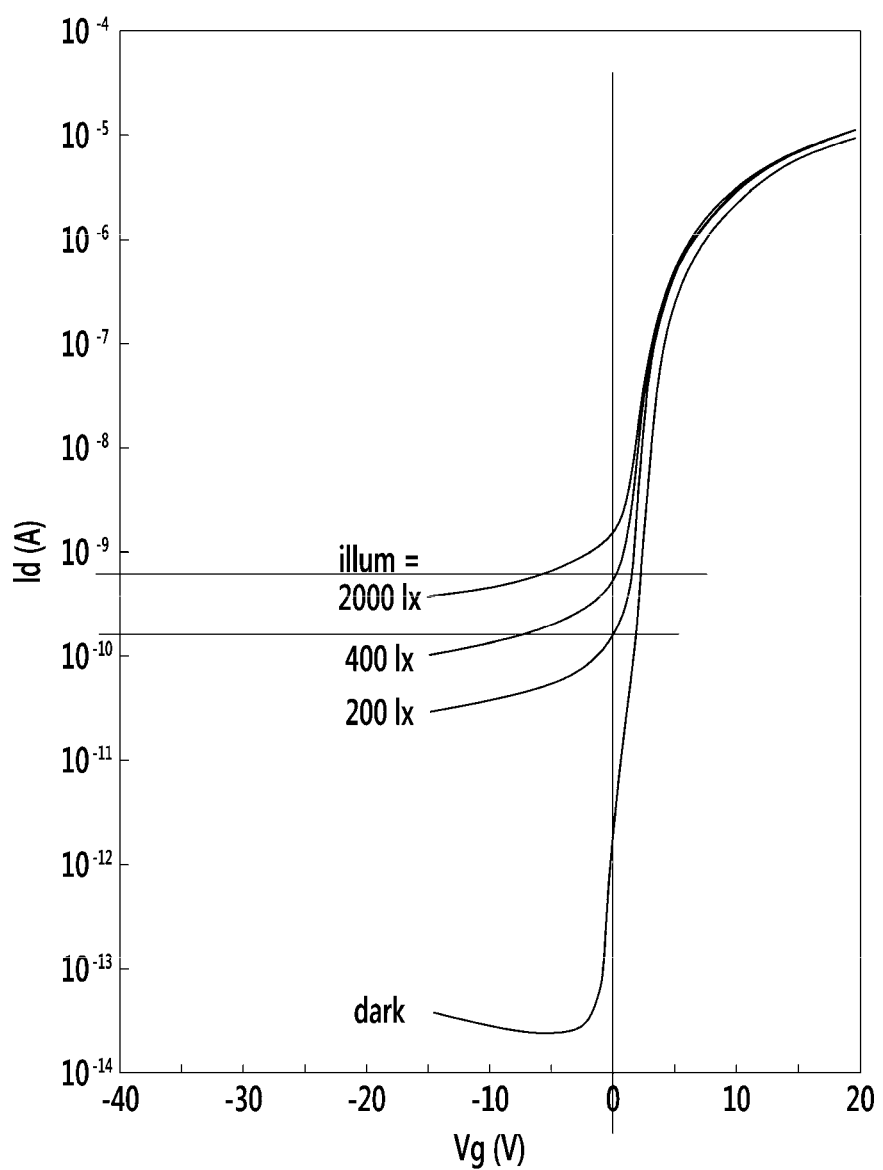
FIG. 4 is a graph showing a magnitude of a current flowing according to a light amount applied to a thin film transistor.

FIG. 4 is a graph showing a magnitude of a current flowing according to a light amount applied to a thin film transistor. The corresponding thin film transistor includes a the semiconductor made of amorphous silicon. In the graph of FIG. 4, a horizontal axis represents a voltage applied to the gate electrode, and a vertical axis represents the current flowing through the channel.

First, a case that the voltage applied to the gate electrode of the thin film transistor is 0 will be described. This is the case that the voltage is not applied to the gate electrode of the thin film transistor such that it is considered that the gate electrode is not formed.

In a case that the thin film transistor is never exposed to the light (dark), the current of about $10^{-12}$ A flows. In a case that the thin film transistor is exposed to the light of about 200 lx (illum.=200 lx), the current of about $10^{-10}$ A flows. In a case that the thin film transistor is exposed to the light of about 2000 lx (illum.=2000 lx), the current of about $10^{-9}$ A flows. In a case that the thin film transistor is exposed to the light of about 400 lx (illum.=400 lx), the current from about $10^{-10}$ A to about $10^{-9}$ A flows. That is, as the light amount incident to the thin film transistor is increased, it may be confirmed that the magnitude of the current flowing through the channel of the thin film transistor is increased, and this current is referred to as a photocurrent.

In an exemplary embodiment of the inventive concept, the light sensing unit 930 is made of the photodiode including the light sensing layer 2154, the first electrode 2173, and the second electrode 2175. Accordingly, as the light amount incident to the light sensing unit 930 is increased, the current flowing to the light sensing unit 930 is increased. The magnitude of the photocurrent is detected through the first electrode 2173 or the second electrode 2175, thereby sensing the light supply amount of the light source unit 900.

Next, a case that the voltage applied to the gate electrode of the thin film transistor is applied to about −10 V will be described. This is the case that the voltage is applied to the gate electrode of the thin film transistor such that it is considered that the gate electrode is formed.

In a case that the thin film transistor is never exposed to the light (dark), the current of about $10^{-14}$ A flows. In a case that the thin film transistor is exposed to the light of about 400 lx (illum.=400 lx), the current of about $10^{-10}$ A flows. In a case that the thin film transistor is exposed to the light of about 200 lx (illum.=200 lx), the current of less than about $10^{-10}$ A flows. In a case that the thin film transistor is exposed to the light of about 2000 lx (illum.=2000 lx), the current high than about $10^{-10}$ A flows. Compared with the case that the voltage applied to the gate electrode is 0 V, it may be confirmed that a difference of the currents according to the light amount applied to the thin film transistor is further increased. That is, as the voltage applied to the gate electrode is decreased, the difference of the currents according to the light amount applied to the thin film transistor is further increased. Accordingly, to further correctly detect the light intensity of the light source unit 900, the gate electrode may also be added to the light sensing unit 930.

Next, an exemplary embodiment including the light sensing unit 930 with the gate electrode will be described with reference to FIG. 5.

Figure 5:
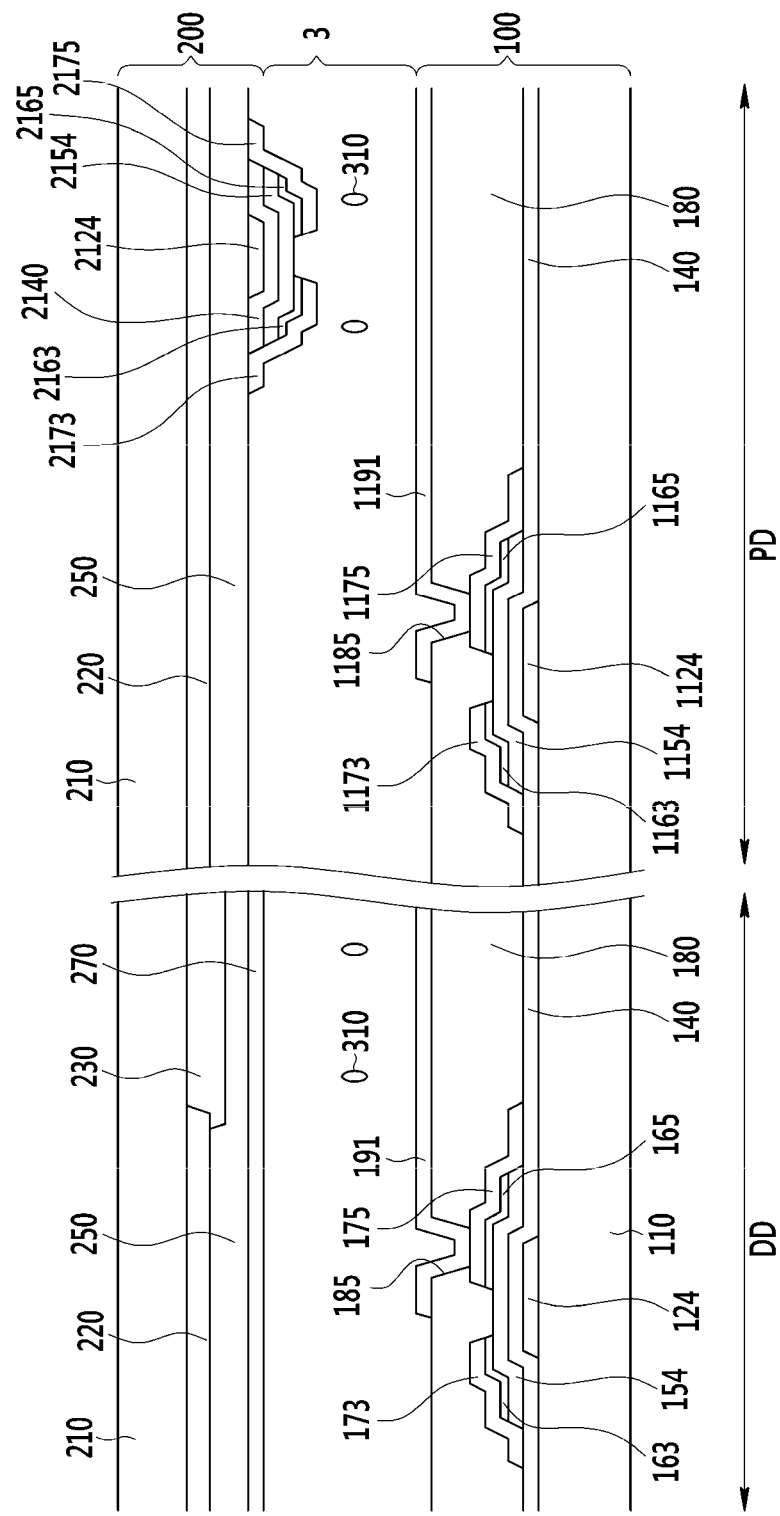
FIG. 5 is a cross-sectional view of a display panel for a display device according to an exemplary embodiment of the present invention.

The display device according to an exemplary embodiment of the inventive concept shown in FIG. 5 is generally the same as the exemplary embodiment of the inventive concept shown in FIG. 1 to FIG. 3 such that the description thereof is omitted. In the previous exemplary embodiment, the light sensing unit is formed of the photodiode, however in the present exemplary embodiment, the light sensing unit is formed of a thin film transistor, and this will be described in detail.

FIG. 5 is a cross-sectional view of a display panel of a display device according to an exemplary embodiment of the inventive concept.

The structure of the lower panel 100 is the same as that of the previous exemplary embodiment.

The structure of the upper panel 200 is partially different from the previous exemplary embodiment in the light sensing unit.

The light blocking member 220 and the color filter 230 are formed on the second substrate 210, the overcoat 250 is formed on the light blocking member 220 and the color filter 230, and the common electrode 270 is formed on the overcoat 250.

Also, the gate electrode 2124 is formed on the overcoat 250. The gate electrode 2124 is made of the low resistivity metal material. The gate electrode 2124 may be formed of the single layer or the multilayer.

The insulating layer 2140 is formed on the gate electrode 2124, the light sensing layer 2154 is formed on the insulating layer 2140, and the ohmic contact layers 2163 and 2165 are formed on the light sensing layer 2154.

The first electrode 2173 and the second electrode 2175 are formed on the ohmic contact layers 2163 and 2165 and the overcoat 250. The first electrode 2173 and the second electrode 2175 are separated from each other and partially overlap the light sensing layer 2154. The first electrode 2173 and the second electrode 2175 may be formed with the same material and the same layer as the common electrode 270.

The gate electrode 2124, the first electrode 2173, and the second electrode 2175 form one light sensing unit 930 along with the light sensing layer 2154. That is, in the present exemplary embodiment, the light sensing unit 930 is formed of the thin film transistor. The light sensing unit 930 is formed in the peripheral area PD.

Next, the display device according to an exemplary embodiment of the inventive concept will be described with reference to FIG. 6.

Figure 6:
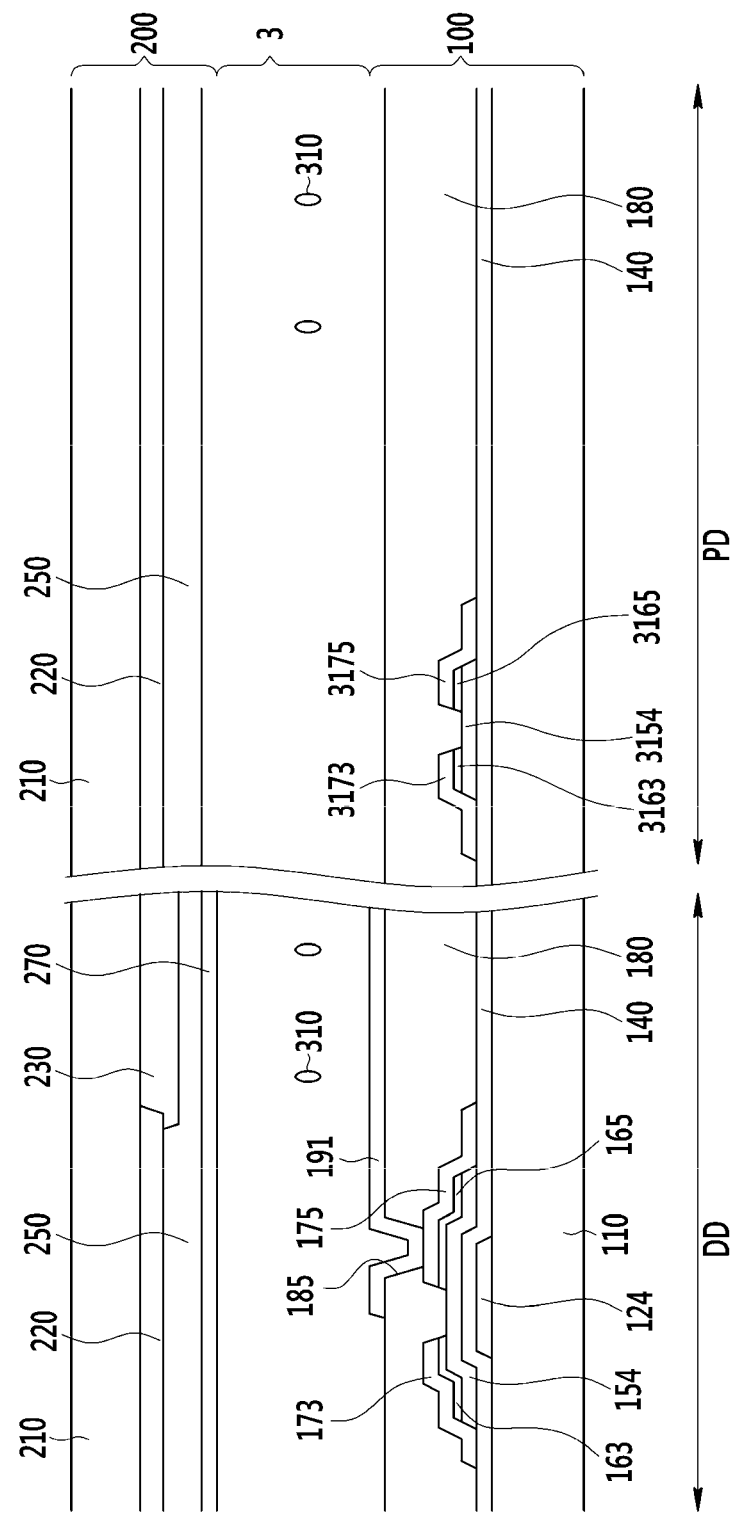
FIG. 6 is a cross-sectional view of a display panel for a display device according to an exemplary embodiment of the present invention.

The display device according to an exemplary embodiment of the inventive concept shown in FIG. 6 is almost the same as that according to an exemplary embodiment of the inventive concept shown in FIG. 1 to FIG. 3, such as the description thereof is omitted. In the previous exemplary embodiment, the light sensing unit is formed on the second substrate, however in the present exemplary embodiment, the light sensing unit is formed on the first substrate, and this will be described in detail.

FIG. 6 is a cross-sectional view of a display panel of a display device according to an exemplary embodiment of the inventive concept.

The structure of the display area DD of the display panel is the same as that of the previous exemplary embodiment.

In the case of the structure of the peripheral area PD of the display panel, the location of the light sensing unit 930 is partially different from the previous exemplary embodiment. The location of the light sensing unit 930 is the same as the previous exemplary embodiment in a plan view, however the location of the light sensing unit 930 is different from the previous exemplary embodiment in the cross-sectional view.

In the case of the lower panel 100, the thin film transistor formed of the gate electrode 124, the semiconductor 154, the source electrode 173, and the drain electrode 175 is formed, and the pixel electrode 191 connected to the thin film transistor is formed on the first substrate 110. The thin film transistor and the pixel electrode 191 are formed in the display area DD.

The gate insulating layer 140 is formed on the first substrate 110, and a light sensing layer 3154 is formed on the gate insulating layer 140. The light sensing layer 3154 may be made of amorphous silicon.

Ohmic contact layers 3163 and 3165 are formed on the light sensing layer 3154. The ohmic contact layers 3163 and 3165 may be made of a material such as n+ hydrogenated amorphous silicon in which an n-type impurity such as phosphorus is doped with a high concentration, or of a silicide. The ohmic contact layers 3163 and 3165 may be disposed on the light sensing layer 3154 and partially overlaps the ohmic contact layers 3163 and 3165. The ohmic contact layers are separated from each other.

A first electrode 3173 and a second electrode 3175 are formed on the ohmic contact layers 3163 and 3165 and the gate insulating layer 140. The first electrode 3173 and the second electrode 3175 are formed on the light sensing layer 3154 and separated from each other.

The first electrode 3173 and the second electrode 3175 form one light sensing unit 930 along with the light sensing layer 3154. That is, in the present exemplary embodiment, the light sensing unit 930 is formed of the photodiode. The light sensing unit 930 is formed in the peripheral area PD on the lower panel 100.

The light sensing layer 3154 of the light sensing unit 930 may be formed with the same layer and the same material as the semiconductor 154 of the thin film transistor. Also, the ohmic contact layers 3163 and 3165 of the light sensing unit 930 may be formed with the same layer and the same material as the ohmic contact layers 163 and 165 of the thin film transistor. Further, the first electrode 3173 and the second electrode 3175 of the light sensing unit 930 may be formed with the same layer and the same material as the source electrode 173 and the drain electrode 175 of the thin film transistor.

In the present exemplary embodiment, a dummy thin film transistor and a dummy pixel electrode are not formed on the first substrate 110. The light sensing unit 930 is formed on the first substrate 110 such that the light sensing unit 930 may measure the light intensity before the light supplied from the light source unit 900 passes through the liquid crystal layer 3.

In the case of the upper panel 200, the light blocking member 220 and the color filter 230 are formed on the second substrate 210, and the overcoat 250 is formed on the light blocking member 220 and the color filter 230. The common electrode 270 is formed on the overcoat 250.

Next, the display device according to an exemplary embodiment of the inventive concept will be described with reference to FIG. 7.

Figure 7:
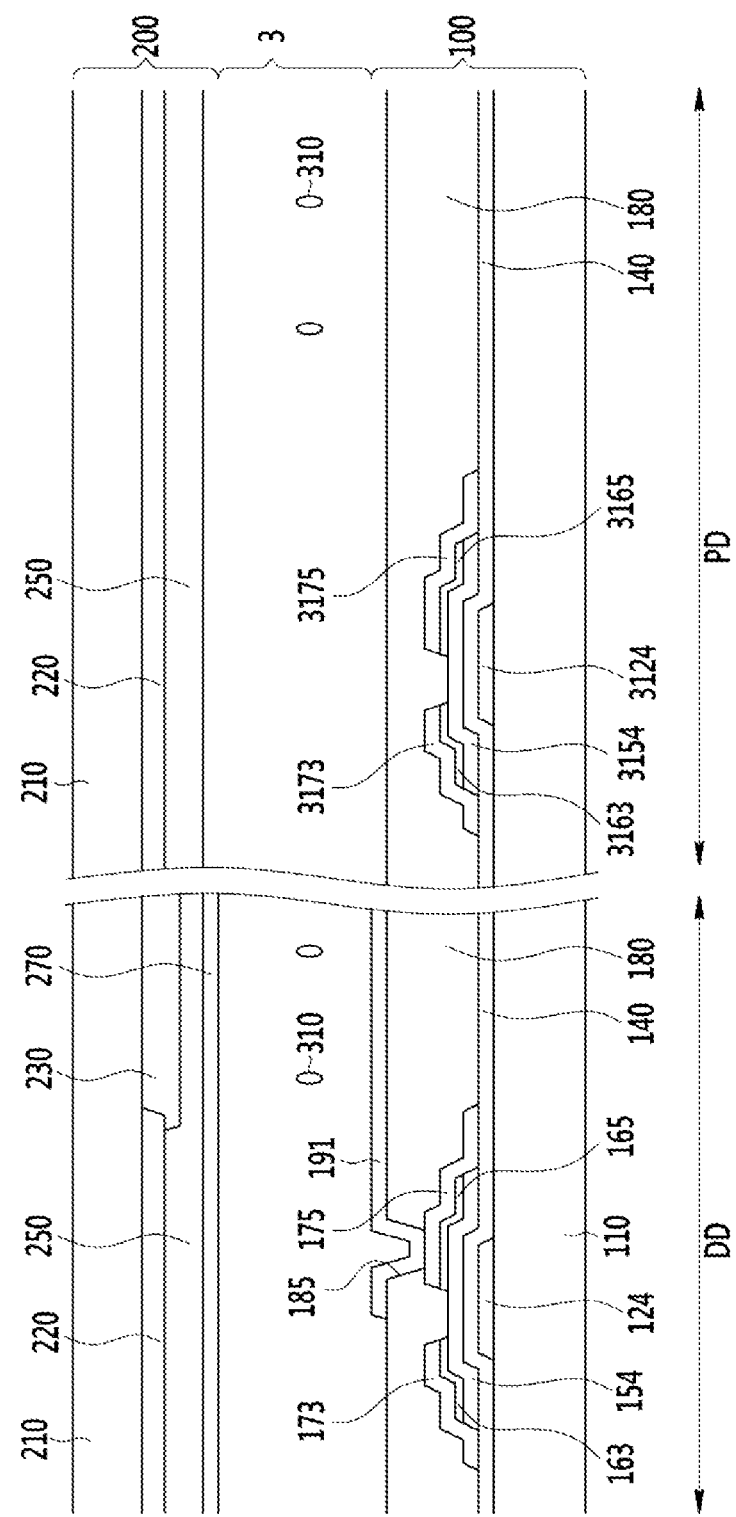
FIG. 7 is a cross-sectional view of a display panel for a display device according to an exemplary embodiment of the present invention.

The display device according to an exemplary embodiment of the inventive concept shown in FIG. 7 is almost the same as that according to an exemplary embodiment of the inventive concept shown in FIG. 6. In the previous exemplary embodiment, the light sensing unit is formed of the photodiode, however the light sensing unit is formed of the thin film transistor in the present exemplary embodiment, and this will be described in detail.

FIG. 7 is a cross-sectional view of a display panel of a display device according to an exemplary embodiment of the inventive concept.

The structure of the upper panel 200 is the same as the previous exemplary embodiment as disclosed in FIG. 6.

The lower panel 100 is partially different from the previous exemplary embodiment of FIG. 6 in the light sensing unit.

The thin film transistor made of the gate electrode 124, the semiconductor 154, the source electrode 173, and the drain electrode 175 is formed, and the pixel electrode 191 connected to the thin film transistor is formed on the first substrate 110. The thin film transistor and the pixel electrode 191 are formed in the display area DD.

Also, a gate electrode 3124 is formed on the first substrate 110. The gate electrode 3124 may be made of the low resistivity metal material. The gate electrode 3124 may be formed of the single layer or the multilayer.

The gate insulating layer 140 is formed on the gate electrode 3124, the light sensing layer 3154 is formed on the insulating layer 140, and ohmic contact layers 3163 and 3165 are formed on the light sensing layer 3154.

The first electrode 3173 and the second electrode 3175 are formed on the ohmic contact layers 3163 and 3165 and the gate insulating layer 140. The first electrode 3173 and the second electrode 3175 are separated from each other and partially overlap the light sensing layer 3154.

The gate electrode 3124, the first electrode 3173, and the second electrode 3175 form one light sensing unit 930 along with the light sensing layer 3154. That is, in the present exemplary embodiment, the light sensing unit 930 is formed of the photodiode. The light sensing unit 930 is formed in the peripheral area PD.

The gate electrode 3124 of the light sensing unit 930 may be formed of the same material and the same layer as the gate electrode 124 of the thin film transistor.

According to the embodiment of the inventive concept, the light sensing unit 930 has a planar structure, thus there is no limitation on a material used as the first electrode and the second electrode as compared to the light sensing unit having stacked structure in which the bottom electrode has to be a transparent conductive material.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A display device comprising:
a display panel displaying an image;
a light source unit supplying light to the display panel;
a light sensing unit embedded in the display panel and sensing a light intensity from the light source unit; and
a light source controller receiving information regarding the light intensity from the light sensing unit to control a light intensity from the light source unit,
wherein the light sensing unit includes:
a light sensing layer, and
a first electrode and a second electrode formed on either side of the light sensing layer in a plan view,
wherein the display panel includes:
a first substrate and a second substrate facing each other;
a thin film transistor formed on the first substrate;
a pixel electrode connected to the thin film transistor; and
a common electrode formed on the second substrate, and
wherein the light sensing unit is formed on the second substrate between the first substrate and the second substrate, and
wherein the first electrode and the second electrode are formed with the same material and at the same layer as the common electrode.

2. The display device of claim 1, wherein the light sensing unit further includes:
an insulating layer formed under the light sensing layer; and
an ohmic contact layer formed between the light sensing layer and the first electrode, and between the light sensing layer and the second electrode.

3. The display device of claim 2, wherein
the light source controller increases the light intensity from the light source unit when the light intensity received from the light sensing unit is smaller than a reference value.

4. The display device of claim 2, wherein
the display panel includes:
a display area; and
a peripheral area surrounding the display area,
wherein the light sensing unit is formed in the peripheral area.

5. The display device of claim 1, wherein
the display panel further includes
a light blocking member formed in the peripheral area on the second substrate.

6. The display device of claim 5, further comprising:
a dummy thin film transistor formed on the peripheral area on the first substrate; and
a dummy pixel electrode connected to the dummy thin film transistor, the dummy pixel electrode overlapping the light sensing unit.

7. The display device of claim 6, wherein:
the thin film transistor and the pixel electrode are formed in the display area; and
the dummy thin film transistor and the dummy pixel electrode are formed in the peripheral area.

8. The display device of claim 1, wherein
the light sensing unit further includes a gate electrode formed under the insulating layer.

9. The display device of claim 8, wherein
the display panel further includes a light blocking member formed in the peripheral area on the second substrate.

10. The display device of claim 9, further comprising:
a dummy thin film transistor formed on the first substrate; and
a dummy pixel electrode connected to the dummy thin film transistor,
wherein the thin film transistor and the pixel electrode are formed in the display area, and
the dummy thin film transistor and the dummy pixel electrode are formed in the peripheral area.

11. The display device of claim 1, wherein
the light sensing layer is made of amorphous silicon.

* * * * *